(12) United States Patent
Baccouche et al.

(10) Patent No.: US 10,899,213 B2
(45) Date of Patent: Jan. 26, 2021

(54) VEHICLE BATTERY SUPPORT

(71) Applicant: Ford Global Technologies, LLC, Dearborn, MI (US)

(72) Inventors: Mohamed Ridha Baccouche, Ann Arbor, MI (US); Saeed Barbat, Novi, MI (US); Rahul Arora, Birmingham, MI (US); Saied Nusier, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 113 days.

(21) Appl. No.: 16/238,182

(22) Filed: Jan. 2, 2019

(65) Prior Publication Data

US 2020/0207198 A1    Jul. 2, 2020

(51) Int. Cl.
| | |
|---|---|
| *B60K 1/04* | (2019.01) |
| *B62D 21/03* | (2006.01) |
| *B62D 21/06* | (2006.01) |
| *B62D 25/20* | (2006.01) |
| *B60L 50/60* | (2019.01) |
| *B60K 6/28* | (2007.10) |
| *B60N 2/005* | (2006.01) |

(52) U.S. Cl.
CPC .............. *B60K 1/04* (2013.01); *B62D 21/03* (2013.01); *B62D 21/06* (2013.01); *B62D 25/20* (2013.01); *B60K 6/28* (2013.01); *B60K 2001/0438* (2013.01); *B60L 50/66* (2019.02); *B60N 2/005* (2013.01); *B60Y 2200/91* (2013.01); *B60Y 2200/92* (2013.01)

(58) Field of Classification Search
USPC .......................................................... 180/312
See application file for complete search history.

(56) References Cited

U.S. PATENT DOCUMENTS

| | | | | |
|---|---|---|---|---|
| 2,676,031 A | * | 4/1954 | Joachim Kolbe .... | B60K 17/165 280/124.103 |
| 7,469,957 B1 | * | 12/2008 | Boettcher .............. | B62D 21/02 296/193.07 |

(Continued)

FOREIGN PATENT DOCUMENTS

| | | | | |
|---|---|---|---|---|
| EP | 2030870 A1 | * | 3/2009 | ............ B62D 21/00 |
| JP | 2012176751 A | | 9/2012 | |

(Continued)

OTHER PUBLICATIONS

Josue Enriquez, "Body in White Architecture for an Electric Vehicle Concept", Master of Science Thesis in the Master Degree Program, Industrial Design Engineering, Chalmers University of Technology, Department of Product and Production Development, Division of Design & Human Factors, Gothenburg, Sweden 2016 (77 pages).

*Primary Examiner* — James A Shriver, II
*Assistant Examiner* — Hilary L Johns
(74) *Attorney, Agent, or Firm* — Ray Coppiellie; Bejin Bieneman PLC

(57) ABSTRACT

A vehicle includes a vehicle frame. The vehicle includes a subframe connected to the vehicle frame. The vehicle includes a tray supported by the vehicle frame. The vehicle includes a V-shaped member having an end at the tray and a pair of legs extending from the end in a vehicle-forward direction to the subframe.

19 Claims, 5 Drawing Sheets

(56) References Cited

U.S. PATENT DOCUMENTS

| | | | | |
|---|---|---|---|---|
| 8,052,204 B2 * | 11/2011 | Boettcher | | B62D 21/02 |
| | | | | 280/785 |
| 8,177,293 B2 * | 5/2012 | Boettcher | | B62D 33/023 |
| | | | | 29/401.1 |
| 8,393,669 B2 * | 3/2013 | Ajisaka | | B62D 21/152 |
| | | | | 296/187.09 |
| 8,408,566 B2 * | 4/2013 | Teichmann | | B62D 21/11 |
| | | | | 180/274 |
| 8,585,132 B2 * | 11/2013 | Klimek | | B60K 1/04 |
| | | | | 296/187.08 |
| 8,602,454 B1 * | 12/2013 | Baccouche | | B60K 1/04 |
| | | | | 180/68.5 |
| 8,608,230 B2 | 12/2013 | Young et al. | | |
| 8,672,354 B2 * | 3/2014 | Kim | | B60K 1/04 |
| | | | | 280/783 |
| 8,960,776 B2 * | 2/2015 | Boettcher | | B62D 33/023 |
| | | | | 296/193.07 |
| 9,259,998 B1 * | 2/2016 | Leanza | | B60K 1/04 |
| 9,533,600 B1 * | 1/2017 | Schwab | | H01M 2/1072 |
| 9,914,481 B2 * | 3/2018 | Kumagai | | B62D 25/025 |
| 9,937,781 B1 * | 4/2018 | Bryer | | B60K 1/04 |
| 9,988,100 B2 | 6/2018 | Kim et al. | | |
| 10,005,349 B2 * | 6/2018 | Baccouche | | B62D 21/155 |
| 10,625,784 B2 * | 4/2020 | Stenvall | | B60L 50/64 |
| 2005/0082876 A1 * | 4/2005 | Akasaka | | B62D 25/025 |
| | | | | 296/203.01 |
| 2012/0256446 A1 * | 10/2012 | Yasuhara | | B62D 25/20 |
| | | | | 296/193.07 |
| 2014/0117716 A1 * | 5/2014 | Patberg | | B62D 1/04 |
| | | | | 296/187.08 |
| 2016/0264177 A1 * | 9/2016 | Kawaguchi | | B62D 25/20 |
| 2018/0337377 A1 * | 11/2018 | Stephens | | B60K 1/04 |

FOREIGN PATENT DOCUMENTS

| | | |
|---|---|---|
| JP | 2018140728 A * | 9/2018 |
| KR | 20130026202 A | 3/2013 |

\* cited by examiner

VEHICLE BATTERY SUPPORT

BACKGROUND

A vehicle may include a battery to provide electrical power. The battery may be supported under a passenger cabin of the vehicle. Force applied to a side of the vehicle, such as a side impact, may deform the vehicle.

DETAILED DESCRIPTION

Figure 1:
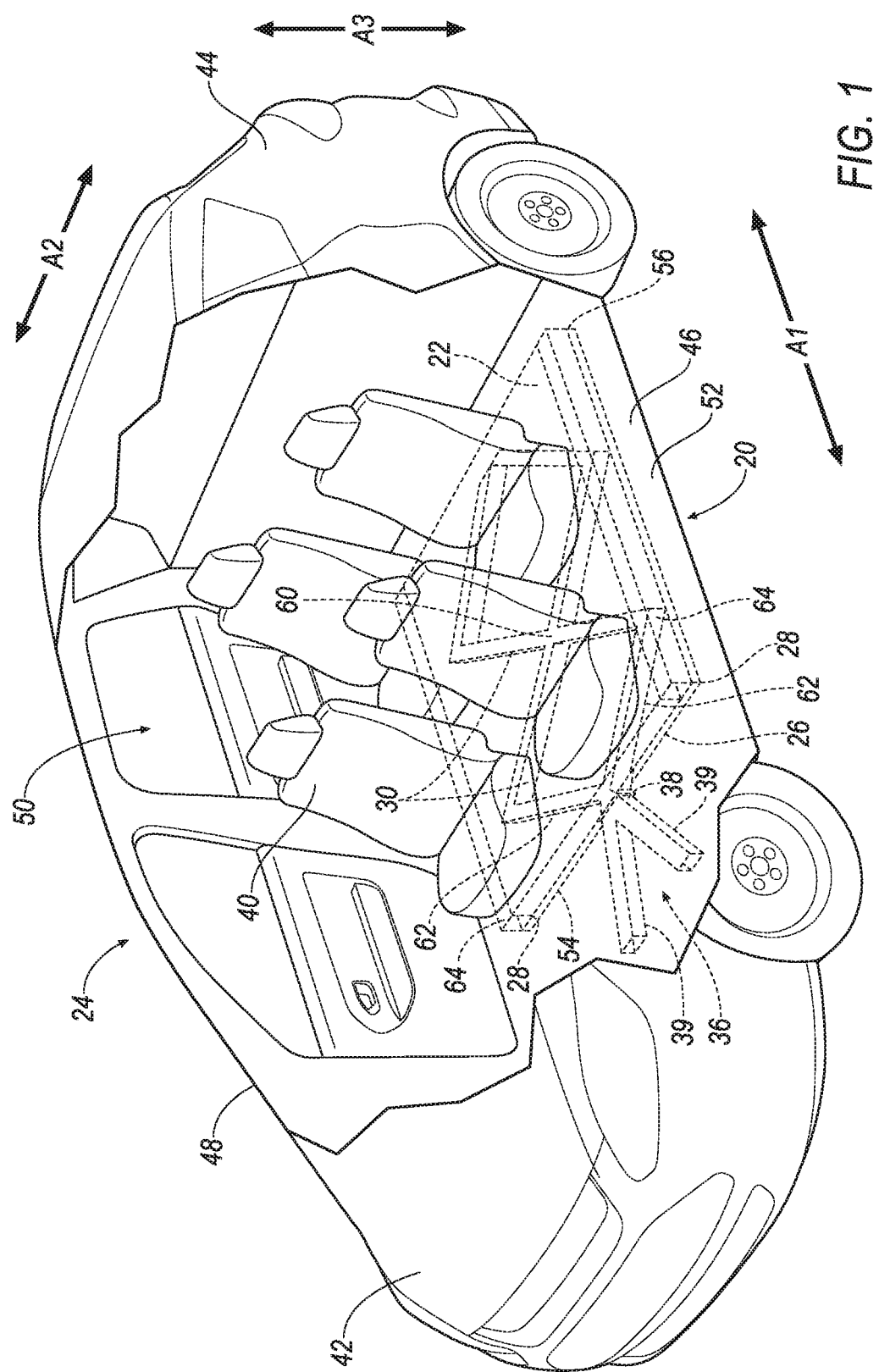
FIG. 1 is a perspective view of a vehicle with an assembly for supporting a battery and cutaway to show a passenger cabin.
Figure 2:
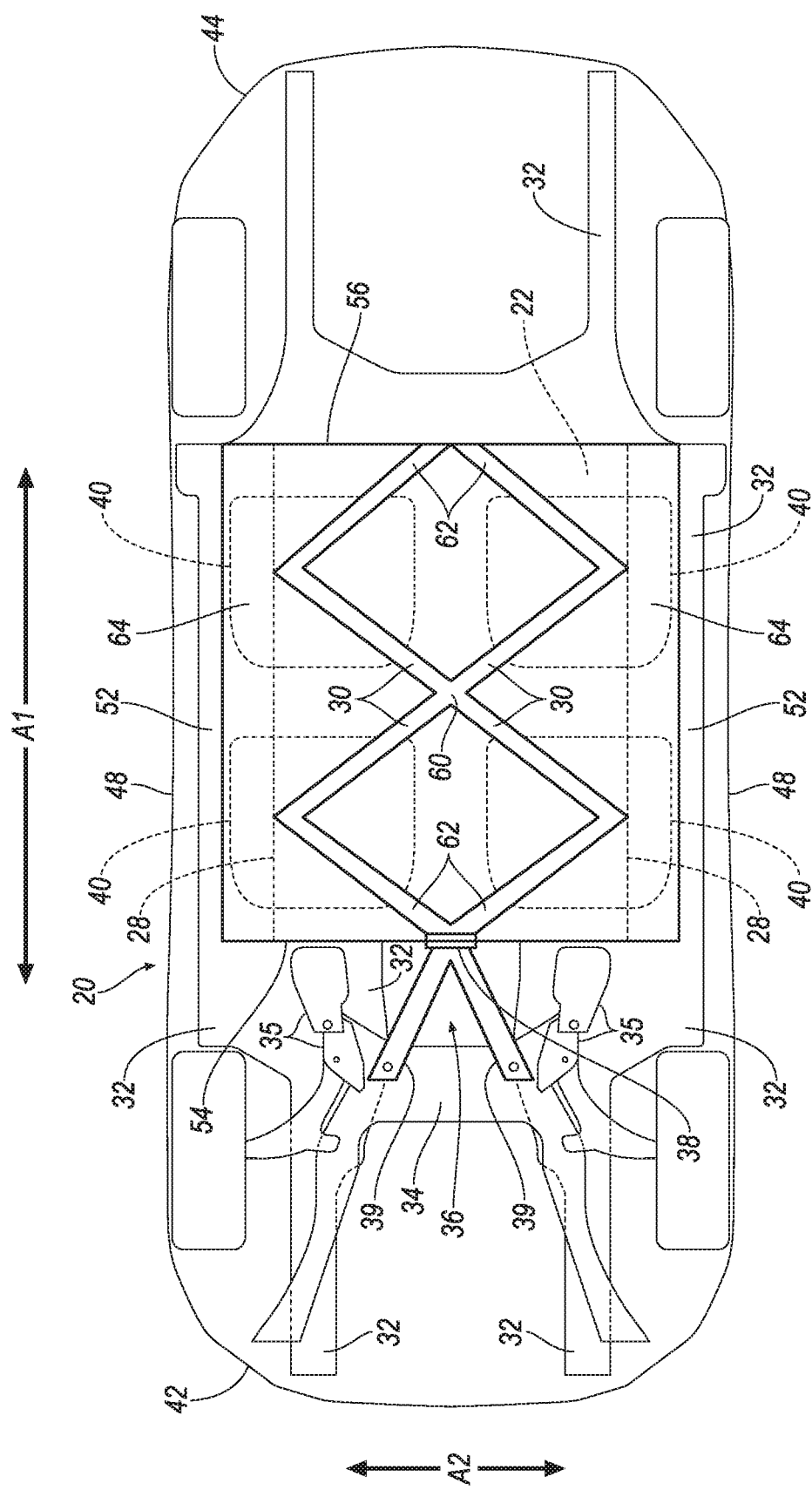
FIG. 2 is a bottom view of the vehicle with the assembly for supporting the battery.
Figure 3:
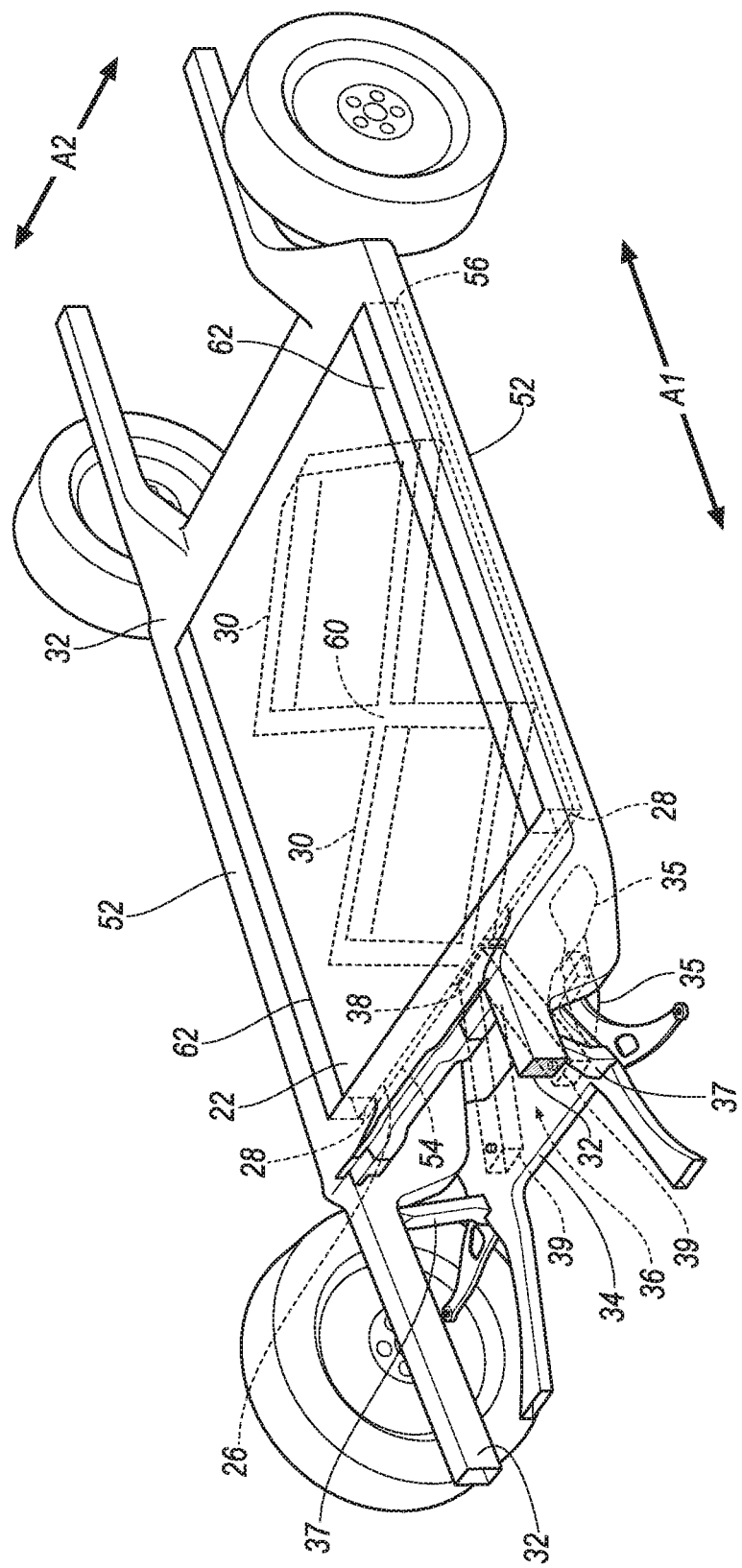
FIG. 3 is a perspective view of a frame of the vehicle with the assembly for supporting the battery.

A vehicle includes a vehicle frame. The vehicle includes a subframe connected to the vehicle frame. The vehicle includes a tray supported by the vehicle frame. The vehicle includes a V-shaped member having an end at the tray and a pair of legs extending from the end in a vehicle-forward direction to the subframe.

The tray may include a pair of side edges spaced from each other along a cross-vehicle axis, and the vehicle may include a pair of intersecting beams extending along the tray between the side edges.

The vehicle may include a seat aligned with one the intersecting beams at one of the side edges relative to a vehicle-longitudinal axis.

The vehicle may include a beam extending from the end of the V-shaped member to one of the intersecting beams at one of the side edges.

The tray may include a side edge, and the vehicle may include a beam extending from the end of the V-shaped member to the side edge.

The beam may be fixed to the end of the V-shaped member.

The beam may be beneath the tray.

The tray may include a second side edge spaced from the side edge, and vehicle may include a second beam extending from the end of the V-shaped member to the second side edge.

The vehicle may include a battery supported by the tray.

The end of the V-shaped member may be centered relative to a cross-vehicle axis.

The frame may include a rocker, the tray may be fixed to the rocker.

A vehicle battery support assembly includes a tray having a pair of side edges spaced from each other. The assembly includes a pair of intersecting beams extending along the tray from one of the side edges to the other.

The assembly may include a battery supported by the tray.

The tray may be between the battery and the intersecting beams.

The tray may include a front edge extending between the side edges, and the assembly may include a beam extending from the front edge to one of the intersecting beams at one of the side edges.

The assembly may include a V-shaped member having an end fixed to the beam and a pair of legs extending from the end away from the tray.

The end of the V-shaped member may be centered between the side edges.

The assembly may include a second beam fixed to the end of the V-shaped member and extending away from the beam to one of the side edges.

The assembly may include a beam elongated along one of the side edges.

The assembly may include a rocker fixed to one of the side edges.

With reference to the Figures, wherein like numerals indicate like parts throughout the several views, an assembly 20 for supporting a battery 22 of a vehicle 24 includes a tray 26 having a pair of side edges 28 spaced from each other. The assembly 20 includes a pair of intersecting beams 30 extending along the tray 26 from one of the side edges 28 to the other. The vehicle 24 includes a frame 32 and a subframe 34 connected to the frame 32. The tray 26 is supported by the frame 32. The assembly 20 includes a V-shaped member 36 having an end 38 at the tray 26 and a pair of legs 39 extending from the end 38 in a vehicle-forward direction, i.e., toward a front 42 of the vehicle 24, to the subframe 34. The assembly 20 reduces deformation of the tray 26, e.g., during an impact to the vehicle 24 by transmitting and distributing force from the impact via the intersecting beams 30, the V-shaped member 36, etc.

In the following description, relative orientations and directions (by way of example, top, bottom, front, rear, outboard, inboard, inward, outward, lateral, left, right, etc.) may be from the perspective of an occupant seated in a seat 40, facing a dashboard of the vehicle 24. Relative orientations and directions may be relative to an orientation of controls for operating the vehicle 24, e.g., an instrument panel. Relative orientations and directions may be relative to a driving direction of the vehicle 24 when wheels of the vehicle 24 are all parallel with each other. Orientations and directions relative to the assembly 20 are given related to when the assembly 20 is supported by the vehicle 24 as described below and shown in the Figures.

The vehicle 24 may be any type of passenger or commercial automobile such as a car, a truck, a sport utility vehicle, a crossover vehicle, a van, a minivan, a taxi, a bus, etc.

The vehicle 24 may define a vehicle-longitudinal axis A1, e.g., extending between the front 42 and a rear 44 of the vehicle 24. The vehicle 24 may define a cross-vehicle axis A2, e.g., extending between a left side 46 and a right side 48 of the vehicle 24. The vehicle 24 may define a vehicle-vertical axis A3, e.g., extending between a top and a bottom of the vehicle 24. The vehicle-longitudinal axis A1, the cross-vehicle axis A2, and the vehicle-vertical axis A3 are perpendicular to each other.

The vehicle 24 includes a passenger cabin 50 to house occupants, if any, of the vehicle 24. The passenger cabin 50 includes one or more seats 40. The seats 40 are shown to be bucket seats, but the seats 40 may be other types. The position and orientation of the seats 40 and components thereof may be adjustable by an occupant. One or more seats 40 are aligned with one of the intersecting beams 30 at one of the side edges 28 relative to the vehicle-longitudinal axis A1. Aligning the seat 40 with the intersecting beam 30 limits deformation of the vehicle 24 and related intrusion into the passenger cabin 50 at the seat 40, e.g., during an impact to the vehicle 24.

The frame 32 may be of a unibody construction. In the unibody construction, a body of the vehicle 24, e.g., rockers 52, pillars, roof rails, etc., serve as the frame 32, and the body is unitary, i.e., a continuous one-piece unit. As another example, the frame 32 may have a body-on-frame construction (also referred to as a cab-on-frame construction). In other words, the body and frame 32 are separate components, i.e., are modular, and the body is supported on and affixed to the frame 32. Alternatively, the frame 32 may have any suitable construction. The frame 32 may be formed of any suitable material, for example, steel, aluminum, etc.

The rockers 52 are the lowest portion of the sides 46, 48 of the vehicle 24. The rockers 52 extend along the vehicle-longitudinal axis A1, e.g., between wheels of the vehicle 24. The rockers 52 may support a door of the vehicle 24 in a closed position. The rockers 52 may include a step to ease entry and egress to and from the vehicle 24.

The subframe 34 supports vehicle components, e.g., an engine, drivetrain, suspension, etc. The subframe 34 may include beams, panels, etc. The subframe 34 may be metal or any material of sufficient strength and rigidity. The subframe 34 is a discrete, separate structure from the frame 32. The subframe 34 is connected to the frame 32. For example, the subframe 34 may be welded to the frame 32, bolted to the frame 32, fixed to the frame 32 with a bracket 35, a beam 37, etc. One or more dampeners, e.g., rubber bushings, springs, etc., may be disposed between the frame 32 and the subframe 34. The subframe 34 may be at the front 42 of the vehicle 24. For example, the subframe 34 may be in front of the passenger cabin 50 relative to the vehicle-longitudinal axis A1.

The tray 26 supports one or more batteries 22 for energizing the vehicle 24. The tray 26 may be rectangular, or any suitable shape. The tray 26 may be a panel free of any openings. The tray 26 may include one or more openings (not shown). The tray 26 may be metal or any suitable materiel. The tray 26 is supported by the frame 32. For example, the tray 26 may be fixed to the frame 32, e.g., to the rockers 52, via welding, fasteners, etc. Additionally or alternatively, one or more intermediary structures, e.g., beams, brackets, etc., may fix the tray 26 to the frame 32.

The tray 26 includes the pair of side edges 28. The side edges 28 may be distal, e.g., at an outer most edge of the tray 28. The side edges 28 may be inboard of beams 64, e.g., where an inboard portion of the beams 64 abuts the tray 28. The side edges 28 are spaced from each other. The side edges 28 may be spaced from each other along the cross-vehicle axis A2. The side edges 28 may be elongated along the vehicle-longitudinal axis A1.

The tray 26 may include a front edge 54. The front edge 54 extends between the side edges 28. For example, the front edge 54 may extend from one of the side edges 28 to the other side edge 28. The front edge 54 may be elongated along the cross-vehicle axis A2.

The tray 26 may include a rear edge 56. The rear edge 56 extends between the side edges 28. For example, the rear edge 56 may extend from one of the side edges 28 to the other side edge 28. The rear edge 56 may be elongated along the cross-vehicle axis A2.

The battery 22 supported by the tray 26 may be of any suitable type for vehicular electrification, for example, lithium-ion batteries, nickel-metal hydride batteries, lead-acid batteries, or ultracapacitors, as used in, for example, plug-in hybrid electric vehicles (PHEVs), hybrid electric vehicles (HEVs), or battery electric vehicles (BEVs).

The V-shaped member 36 transfers and distributes force applied to vehicle 24, e.g., during an impact to the vehicle 24, as described further below. The V-shaped member 36 may be metal, or any suitable material having sufficient strength and rigidity. The V-shaped member 36 includes the end 38 and the pair of legs 39 extending from the end 38. The legs 39 meet each other at the end 38, defining the "V" of the V-shaped member 36.

The end 38 of the V-shaped is at the tray 26, e.g., at the front edge 54 of the tray 26. The end 38 of the V-shaped member 36 may be centered relative to the cross-vehicle axis A2. For example, the end 38 may be midway between the left side 46 and the right side 48 of the vehicle 24. The end 38 of the V-shaped member 36 may be centered between the side edges 28, e.g., relative to the cross-vehicle axis A2. For example, the end 38 may be at the front edge 54 midway between the side edges 28.

The legs 39 extend from the end 38 away from the tray 26. For example, the legs 39 may extend from the end 38 and front edge 54 of the tray 26 in the vehicle-forward direction. In other words, the legs 39 may extend from the end 38 toward the front 42 of the vehicle 24. The legs 39 may extend from the end 38 to the subframe 34. The legs 39 may be fixed to the subframe 34. For example, the legs 39 may be bolted, welded, etc., to the subframe 34.

One or more beams 30, 62, 64 reduce deformation of the tray 26, e.g., during an impact to the vehicle 24. The beams 30, 62, 64 may be metal, or any suitable material. The beams may be fixed to the tray 26, e.g., via welding, fasteners, etc. The beams 30, 62, 64 and the tray 26 may be monolithic, i.e., a one-piece unit without any fasteners, joints, welding, adhesive, etc., fixing the beams 30, 62, 64 and the tray 26 to each other.

Intersecting beams 30 extend along the tray 26 between the side edges 28. For example, each intersecting beam 30 may extend along the tray 26 from one of the side edges 28 to the other side edge 28. The intersecting beams 30 intersect with each other. In other words, one of the intersecting beams 30 crosses another of the intersecting beams 30 at an intersection 60. The intersection 60 may be midway between the side edges 28. The intersecting beams 30 may be linear.

One or more support beams 62 extend from the front edge 54 and the rear edge 56 to one of the side edges 28. The support beams 62 may extend from the end 38 of the V-shaped member 36 at the front edge 54 to the side edges 28. The support beams 62 may extend to one of the intersecting beams 30 at one of the side edges 28. The support beams 62 may meet the intersecting beams 30 at the side edges 28. The support beams 62 may be fixed to the end 38 of the V-shaped member 36. For example, the support beams 62 at the front edge 54 may be bolted, welded, etc., to the end 38 of the V-shaped member 36.

The intersecting beams 30 and the support beams 62 may be opposite the battery 22 relative to the tray 26. In other words, the tray 26 may be between the battery 22 and the intersecting beams 30 and the support beams 62. For example, the intersecting beams 30 and the support beams 62 may be beneath the tray 26. The battery 22 may be above the tray 26. The intersecting beams 30 and the support beams 62 may collectively define a pair of diamond shapes.

Side beams 64 may be elongated along the side edges 28 of the tray 26. The side edges 28 may extend from the front edge 54 to the rear edge 56. The side beams 64 and the battery 22 may be on the same side of the tray 26. For example, the side beams 64 and the battery 22 may be above the tray 26, e.g., relative to the vehicle-vertical axis A3. The battery 22 may be between the side beams 64, e.g., along the cross-vehicle axis A2.

Figure 4:
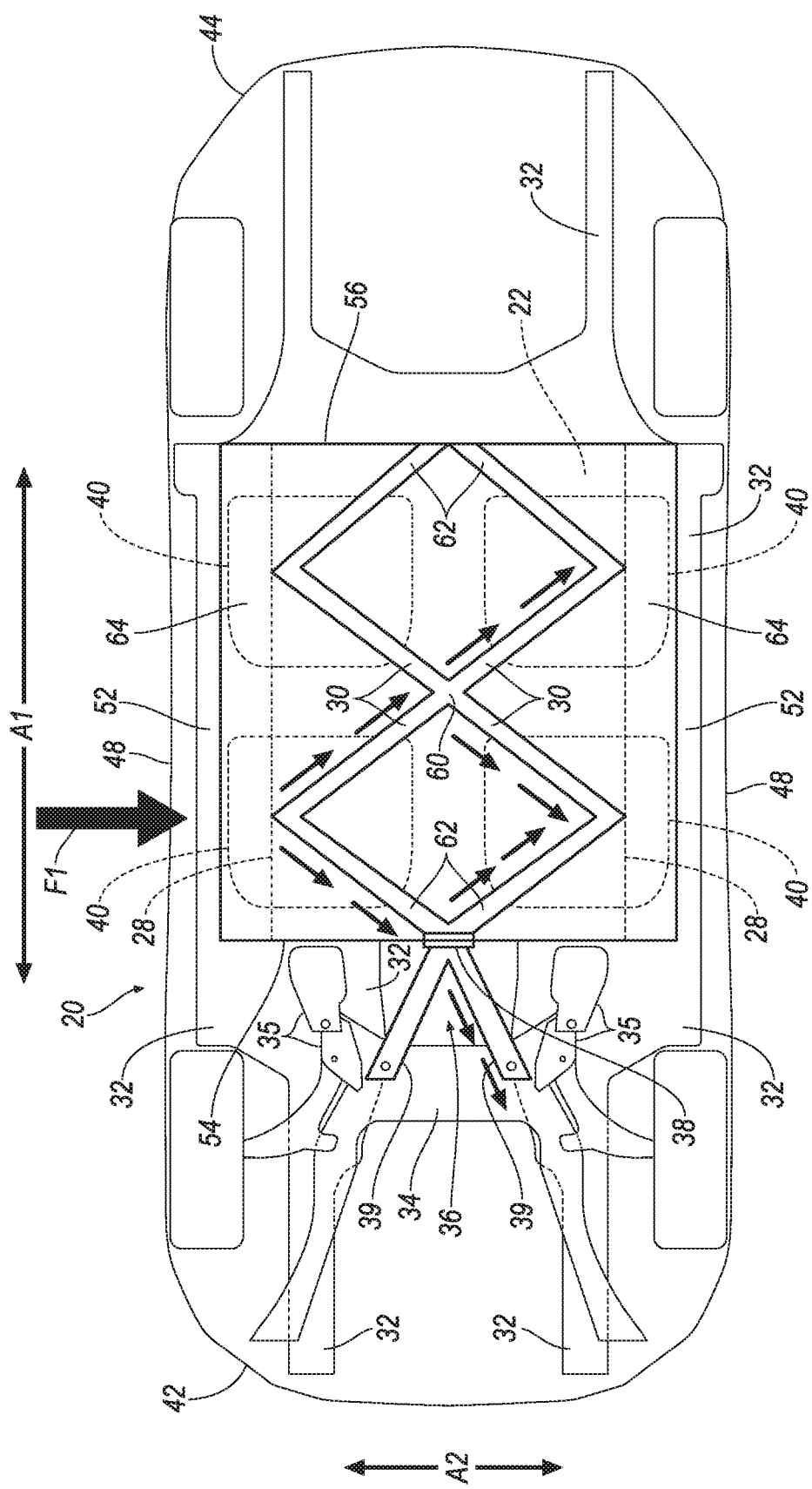
FIG. 4 is a bottom view of the vehicle with the assembly for supporting the battery with a force applied to a side of the vehicle.

With reference to FIG. 4, force F1 applied to the vehicle 24 during a side impact is transmitted from the rocker 52 subject to impact to one of the side beams 64. From the side beam 64 the force F1 is transmitted to the support beams 62 and the intersecting beams 30. From the support beams 62 and the intersecting beams 30 the force F1 is transmitted to the side beam 64 and rocker 52 opposite the impact, and to the V-shaped member 36, the subframe 34 and frame 32. Thus, the force F1 is distributed through multiple vehicle components and deformation of the tray 26 is reduced.

Figure 5:
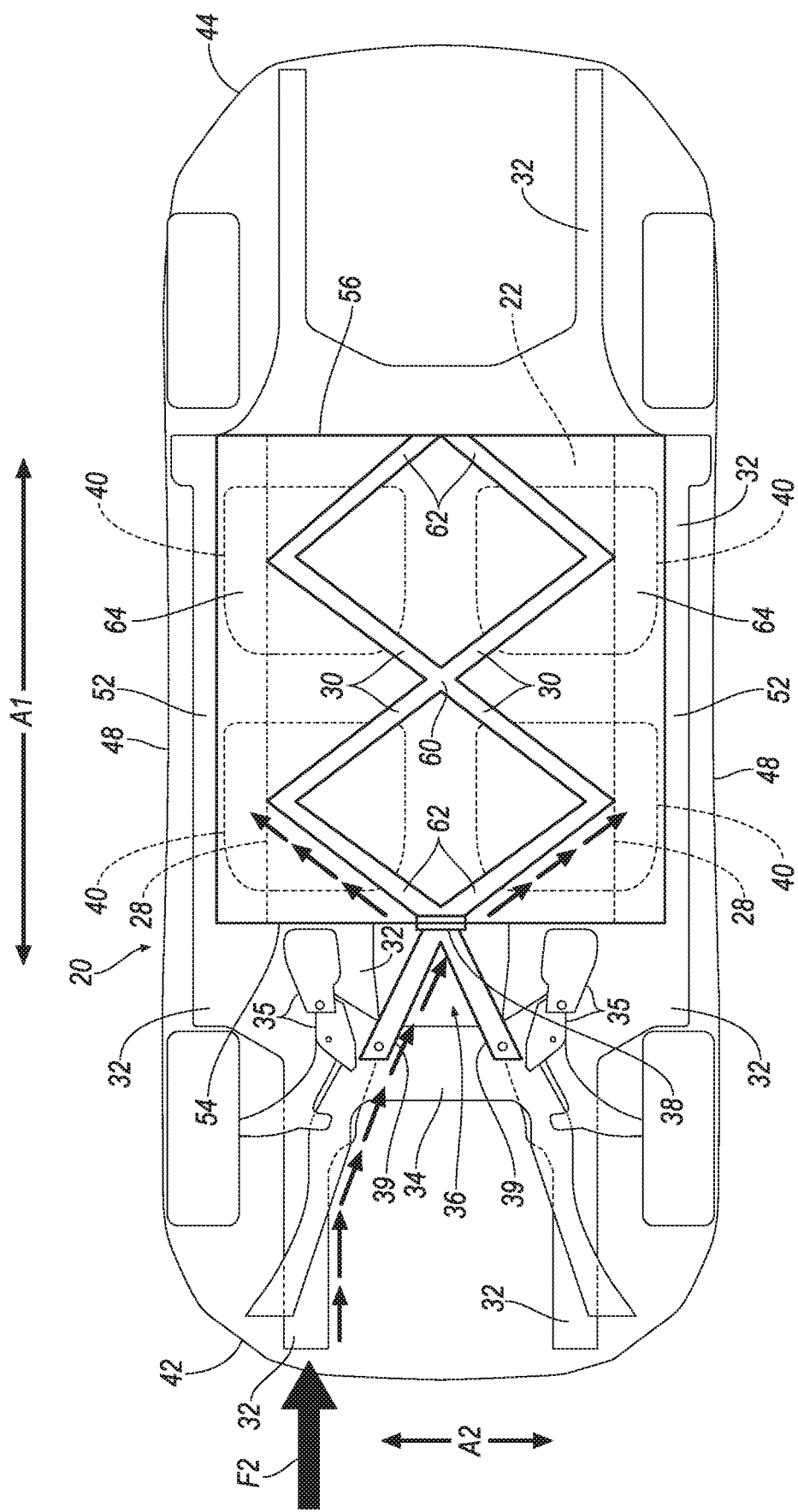
FIG. 5 is a bottom view of the vehicle with the assembly for supporting the battery with a force applied to a front of the vehicle.

With reference to FIG. 5, force F2 applied to the vehicle 24 during a front impact is transmitted from the front 42 of the vehicle 24 to the frame 32 and sub-frame 34. From the sub-frame 32, the force F2 is transmitted through the legs 39 to the end 38 of the V-shaped member 36. From the end 38 the force F2 is transmitted along the support beams 62 to the side beams 64 and the rockers 52. Thus, the force F2 is distributed through multiple vehicle components and deformation of the tray 26 is reduced.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
a vehicle frame;
a subframe connected to the vehicle frame;
a tray supported by the vehicle frame, the tray having a pair of side edges spaced from each other along a cross-vehicle axis;
a V-shaped member having an end at the tray and a pair of legs extending from the end in a vehicle-forward direction to the subframe; and
a beam having a first end at the end of the V-shaped member, the beam extending rearward from the end of the V-shaped member to one of the side edges.

2. The vehicle of claim 1, further comprising a pair of intersecting beams extending along the tray between the side edges.

3. The vehicle of claim 2, further comprising a seat aligned with one of the intersecting beams at one of the side edges relative to a vehicle-longitudinal axis.

4. The vehicle of claim 2, wherein the beam extends from the end of the V-shaped member to one of the intersecting beams at one of the side edges.

5. The vehicle of claim 1, wherein the beam is elongated transversely to both the vehicle-forward direction and the cross-vehicle axis.

6. The vehicle of claim 1, wherein the beam is fixed to the end of the V-shaped member.

7. The vehicle of claim 1, wherein the beam is beneath the tray.

8. The vehicle of claim 1, further comprising a second beam extending from the end of the V-shaped member to the second side edge.

9. The vehicle of claim 1, further comprising a battery supported by the tray.

10. The vehicle of claim 1, wherein the end of the V-shaped member is centered between the pair of side edges relative to the cross-vehicle axis.

11. The vehicle of claim 1, wherein the frame includes a rocker, the tray fixed to the rocker.

12. A vehicle battery support assembly, comprising:
a tray having a pair of side edges spaced from each other, and a front edge extending between the side edges;
a pair of intersecting beams extending along the tray from one of the side edges to the other; and
a beam having a first end centered between the side edges at the front edge, the beam extending rearward from the first end at the front edge to one of the intersecting beams at one of the side edges.

13. The assembly of claim 12, further comprising a battery supported by the tray.

14. The assembly of claim 13, wherein the tray is between the battery and the intersecting beams.

15. The assembly of claim 12, further comprising a V-shaped member having an end fixed to the beam at the front edge and a pair of legs extending from the end away from the tray.

16. The assembly of claim 15, wherein the end of the V-shaped member is centered between the side edges.

17. The assembly of claim 15, further comprising a second beam fixed to the end of the V-shaped member and extending away from the beam to one of the side edges.

18. The assembly of claim 12, further comprising a beam elongated along one of the side edges.

19. The assembly of claim 12, further comprising a rocker fixed to one of the side edges.

* * * * *